(12) United States Patent
Dohm et al.

(10) Patent No.: US 7,789,432 B2
(45) Date of Patent: Sep. 7, 2010

(54) LOCKABLE AND POSITIONABLE SWIVEL FITTING

(75) Inventors: Steven J. Dohm, Ravenna, MI (US); Gregory Kreczko, Kalamazoo, MI (US); Ronald A. Moner, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 120 days.

(21) Appl. No.: 12/047,794

(22) Filed: Mar. 13, 2008

(65) Prior Publication Data
US 2008/0224468 A1 Sep. 18, 2008

Related U.S. Application Data

(60) Provisional application No. 60/894,466, filed on Mar. 13, 2007.

(51) Int. Cl.
*F16L 27/00* (2006.01)
(52) U.S. Cl. ............... 285/282; 285/275; 285/278; 285/184
(58) Field of Classification Search ........... 285/275, 285/282, 280, 279, 278, 145.2, 147.2, 184
See application file for complete search history.

(56) References Cited

U.S. PATENT DOCUMENTS

| | | | |
|---|---|---|---|
| 2,116,004 A | 5/1938 | Tear | |
| 2,146,385 A | 2/1939 | Tear | |
| 2,423,069 A | 6/1947 | McElhose et al. | |
| 2,503,281 A | 4/1950 | Lynch et al. | |
| 2,529,685 A * | 11/1950 | Ginter | 285/147.2 |
| 2,587,170 A * | 2/1952 | Klingler et al. | 285/279 |
| 2,599,039 A | 6/1952 | Baker | |
| 2,791,451 A | 5/1957 | Rostan | |
| 3,188,123 A | 6/1965 | Hansen | |
| 3,924,882 A | 12/1975 | Ellis | |
| 4,239,262 A | 12/1980 | Krupp et al. | |
| 4,567,924 A | 2/1986 | Brown | |
| 4,793,821 A | 12/1988 | Fowler et al. | |
| 4,807,370 A * | 2/1989 | Trimble | 285/181 |
| 4,834,667 A | 5/1989 | Fowler et al. | |

(Continued)

FOREIGN PATENT DOCUMENTS

RU 2 193 717 11/2002

OTHER PUBLICATIONS

VOSS, "Product description VOSS quick connect system 214," 2 pages.
"PTC Composite Push-In Air Brake Fitting," pp. 14-17, Parker Hannifin Corporation, Parker Brass Products Division, Otsego, Michigan.

*Primary Examiner*—David E Bochna
(74) *Attorney, Agent, or Firm*—Renner, Otto, Boisselle & Sklar, LLP

(57) ABSTRACT

A coupling that can be easily and repeatedly rotationally adjusted after assembly and/or installation. The coupling can comprise a male part insertable into a female part to a first position whereat the male part is rotationally locked with respect to the female part. Upon further insertion of the male part into the female part to a second position, the male part is rotationally unlocked from the female part and the male part then can be rotated relative to the female part. Once rotational adjustment is complete, the male part can be returned to the locked position to rotationally lock the coupling.

16 Claims, 24 Drawing Sheets

U.S. PATENT DOCUMENTS

| | | | |
|---|---|---|---|
| 5,395,139 A * | 3/1995 | Morrisson | 285/278 |
| 5,558,376 A | 9/1996 | Woehl | |
| 5,868,435 A | 2/1999 | Bartholomew | |
| 6,517,119 B2 * | 2/2003 | Thomas | 285/278 |
| 6,616,197 B2 | 9/2003 | Sampson | |
| 6,682,106 B2 | 1/2004 | Parker | |
| 2006/0061094 A1 | 3/2006 | Vyse et al. | |

* cited by examiner

LOCKABLE AND POSITIONABLE SWIVEL FITTING

RELATED APPLICATIONS

This application claims the benefit of U.S. Provisional Application No. 60/894,466 filed Mar. 13, 2007, which is hereby incorporated herein by reference in its entirety.

FIELD OF THE INVENTION

The invention herein described relates generally to fittings and, more particularly, the invention relates to swivel fittings.

BACKGROUND OF THE INVENTION

Fittings, often referred to as couplings (e.g., quick-connect, plug-to-connect, push-in couplings, etc.), heretofore have been provided to allow for quick connection and/or sealing of a coupler socket (female half) and a nipple (male half). Such couplings have particular application for connecting tubes to one another or a tube to another component such as a manifold block.

In a typical quick-connect coupling, for example, the male and female parts of the coupling are connected together simply by pushing the male part into the female part. This has the advantage of permitting the parts to be very quickly and easily coupled.

Latch mechanisms are often provided on one or both of the male and female parts for maintaining the parts in a connected (coupled) state. Such latch mechanisms are typically configured to automatically engage when the male part is coupled with the female part, and act to restrict withdrawal of the male part from the female part.

Quick-connect couplings also have been provided with a rotational interlock mechanism for locking the male and female parts against rotation relative to each other. One type of interlock mechanism, commonly referred to as an anti-twist ring, can be installed on an exterior of a fitting to lock the male and female parts together against relative rotation. The anti-twist ring is typically keyed to the body of the male or female part, and a mating part secured to the other of the male or female parts has protrusions for mating with slots in the anti-twist ring when the coupling is assembled. The protrusions and slots interlock to restrict relative rotation of the male and female parts.

While such anti-twist rotational interlocks are suitable for some applications, they typically require the fitting to be rotationally adjusted prior to assembly, and do not readily allow rotational adjustment after the coupling is assembled. Further such fittings do not provide for positioning and rotation of an angled fitting, such as 90 degree elbow, 45 degree elbow, tee, etc.

SUMMARY OF THE INVENTION

The present invention provides a coupling that can be easily and repeatedly rotationally adjusted after assembly and/or installation. The coupling can comprise a male coupling part insertable into a female coupling part to a first position whereat the male part is rotationally locked with respect to the female part. Upon further insertion of the male part into the female part to a second position, the male part is rotationally unlocked from the female part and the male part then can be rotated relative to the female part. Once rotational adjustment is complete, the male part can be returned to the locked position to rotationally lock the coupling.

Accordingly, a coupling comprises a female part and a male part telescopically insertable into the female part to enable fluid communication between respective passages in the male and female parts. The male part is insertable into the female part to a first position whereat the male and female parts are fixed against rotation relative to each other, and further insertable into the female part to a second position whereat the male and female parts can be rotated relative to each other.

More particularly, the male and female parts can have rotationally interfering members for rotationally interlocking the male and female parts together in the first position, and wherein when the male part is inserted further into the female part to the second position, the rotationally interfering members are axially spaced apart thereby allowing rotation of the male part with respect to the female part. A biasing member for biasing the male part towards the first position can be provided. The biasing member can be a spring element formed integrally with at least one of the male part or female part. A seal can be provided for sealing the male part to the female part, and the seal can be captured between a shoulder on the male part and a counterbore in the female part. The seal can be a resilient sealing element configured to bias the male part towards the first position.

In accordance with another aspect, the female part can include a socket that opens to an axial end of the female part, the socket having a nipple receiving portion and a catch portion at a location axially inwardly of the nipple receiving portion. The male part can include a nipple portion that is telescopically insertable into the socket, the nipple portion having a radially extending barb for engaging a surface of the catch portion to restrict withdrawal of the male part from the female part when in the first position while still allowing further insertion of the male part into the female part.

Mating surfaces of the catch portion and the barb can have interlocking protrusions and recesses that restrict rotation of the male part relative to the female part when the male part is in the first position, and wherein when the male part is inserted further into the socket to the second position, the interlocking protrusions on the mating surfaces of the catch portion and the barb are axially spaced apart thereby allowing rotation of the male part with respect to the female part. Further insertion of the male part into the female part beyond the second position can be limited by interference between a radially extending shoulder on the nipple portion of the male part and a counterbore in the female part.

In accordance with another aspect, the coupling can further include a swivel lock member for axially and rotationally interlocking the male part to the female part, the swivel lock member having tubular portion having a barb on a first end thereof for engaging a catch surface of the female part to prevent withdrawal of the swivel lock member from the female part, and a radially outwardly extending shoulder at a second end of the tubular portion. An outer circumferential surface of the shoulder can have a non-circular cross-section for engaging a correspondingly shaped inner circumferential surface of a counterbore of the male part for rotationally and axially fixing the male part to the swivel lock member when the male part is in the first position. The swivel lock member can be rotationally and axially interlocked with the female part such that when the male part is further inserted into the female part, the counterbore of the male part is axially spaced apart from the shoulder of the swivel lock thereby allowing rotation of the male part with respect to the female part.

In accordance with another aspect, the male part can have radially extending teeth on an outer surface thereof for engaging with a plurality of cantilevered axially extending projections of the female part configured to engage the teeth on the male part when the male part is in the first position thereby rotationally interlocking the male part and female part. The male part can further comprise an angled surface spaced axially from the teeth for urging the projections radially outwardly when the male part is further inserted into the female part to the second position to thereby disengage the projections from the teeth to allow rotation of the male part with respect to the female part.

The foregoing and other features of the invention are hereinafter described in detail in conjunction with the accompanying drawings which set forth exemplary embodiments illustrating a few of the various ways in which the principles of the invention may be employed.

DETAILED DESCRIPTION

Figure 1:
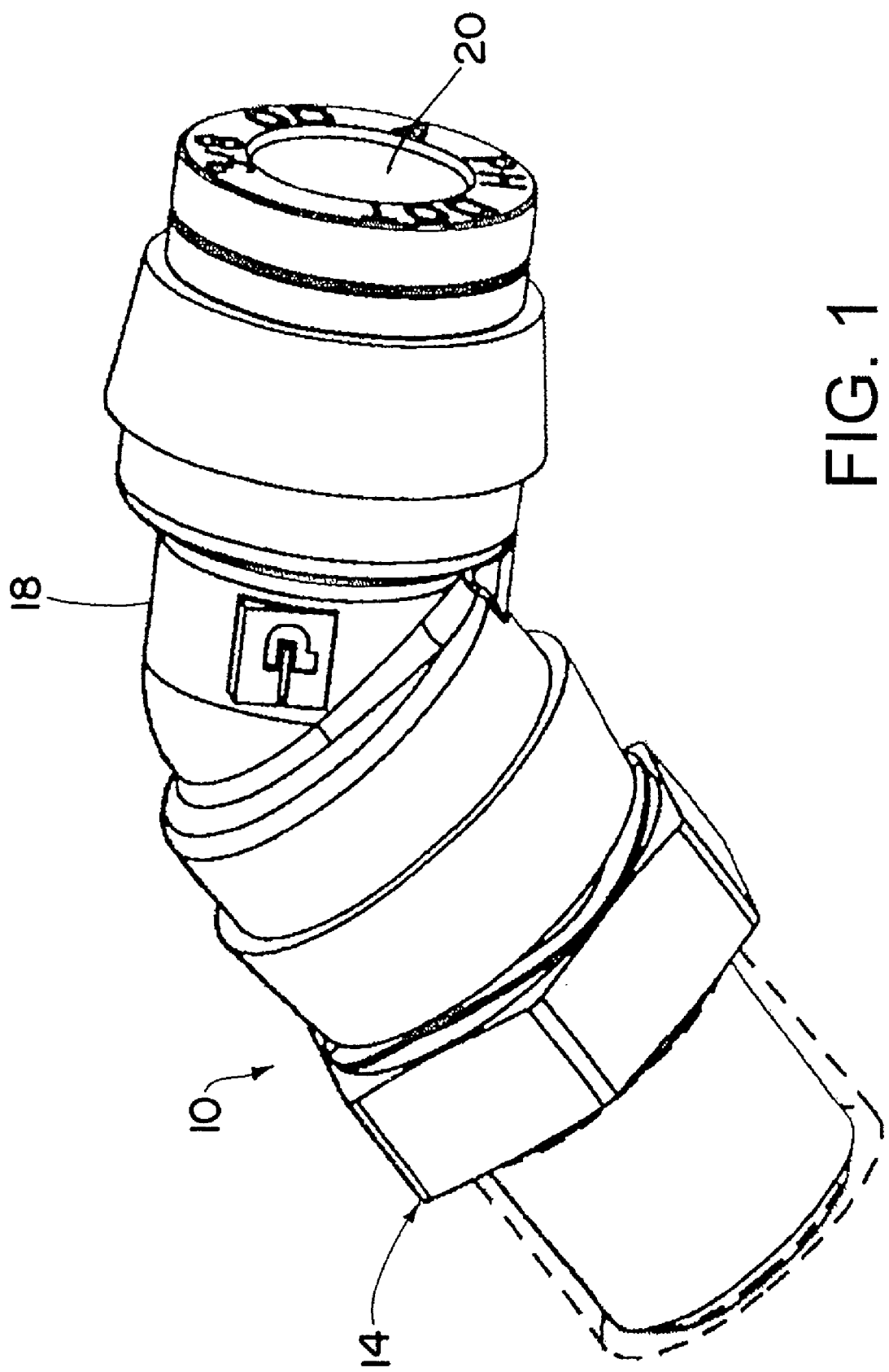
FIG. 1 is perspective view of an exemplary coupling in accordance with the invention.
Figure 2:
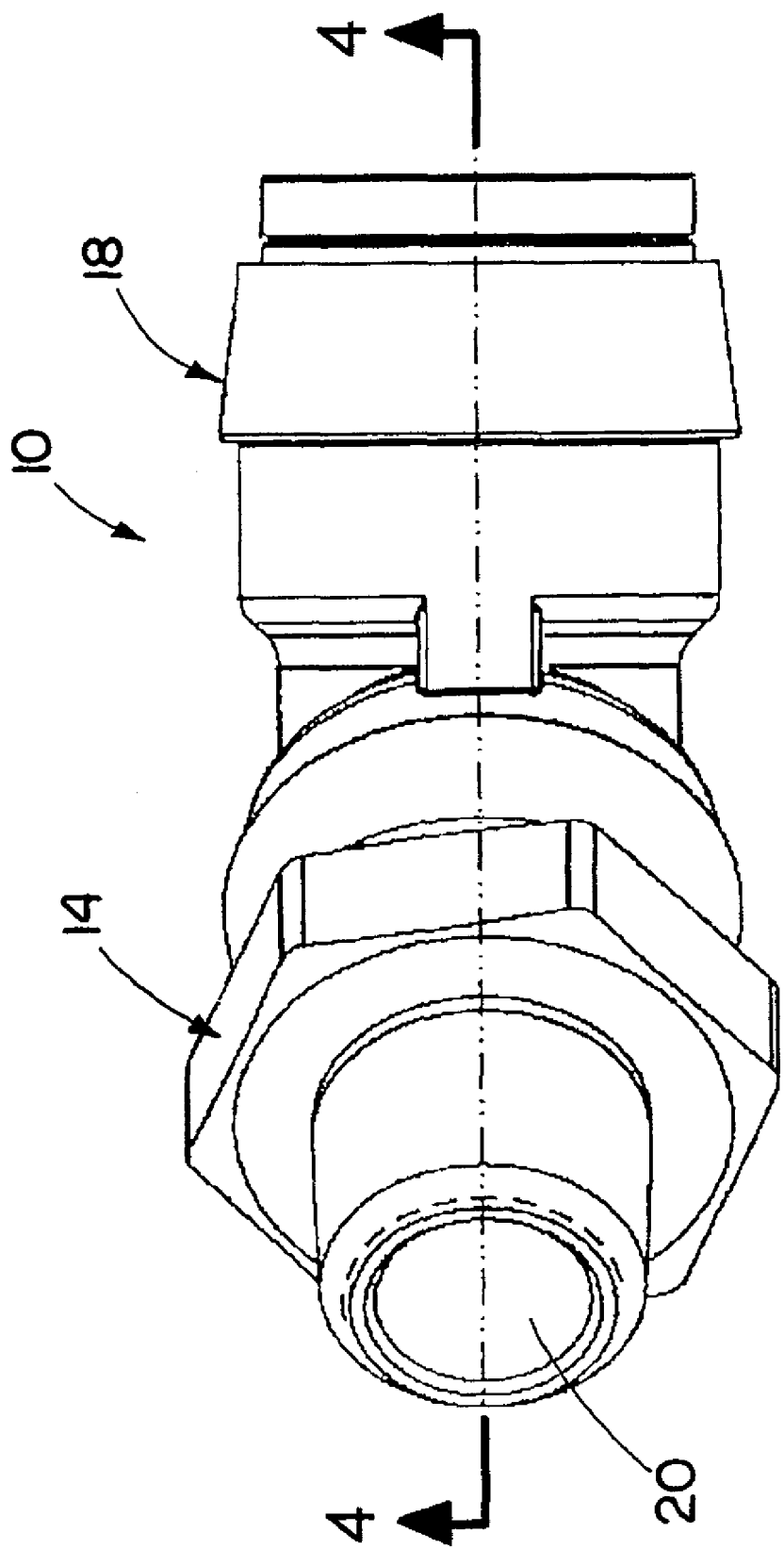
FIG. 2 is another perspective view of the coupling of FIG. 1.

Referring now in detail to the drawings, and initially to FIGS. 1-6, an exemplary coupling 10 in accordance with the invention is illustrated. The coupling 10 generally includes a swivel stem 14 (male part) and a body 18 (female part). As will be appreciated, a passageway 20 through the coupling 10 allows fluid, such as air, to pass between a first conduit (tube, manifold block, etc.) connected to the swivel stem 14 and a second conduit (tube, manifold block, etc.) connected to the plastic body 18.

In the illustrated embodiments, the swivel stem 14 is generally configured to be screwed into, or otherwise connected to, a port of a manifold block or the like, for example. The stem 14 includes a portion thereof that is hexagonal in cross-section for engagement with a suitable tool, such as a wrench, for tightening the stem 14 to the manifold block. The body 18 in the illustrated embodiments is typically configured to receive a tube or the like. Such manifolds and tubes are not illustrated in the drawings such that other features of the coupling 10 can be more easily seen.

Figure 3:
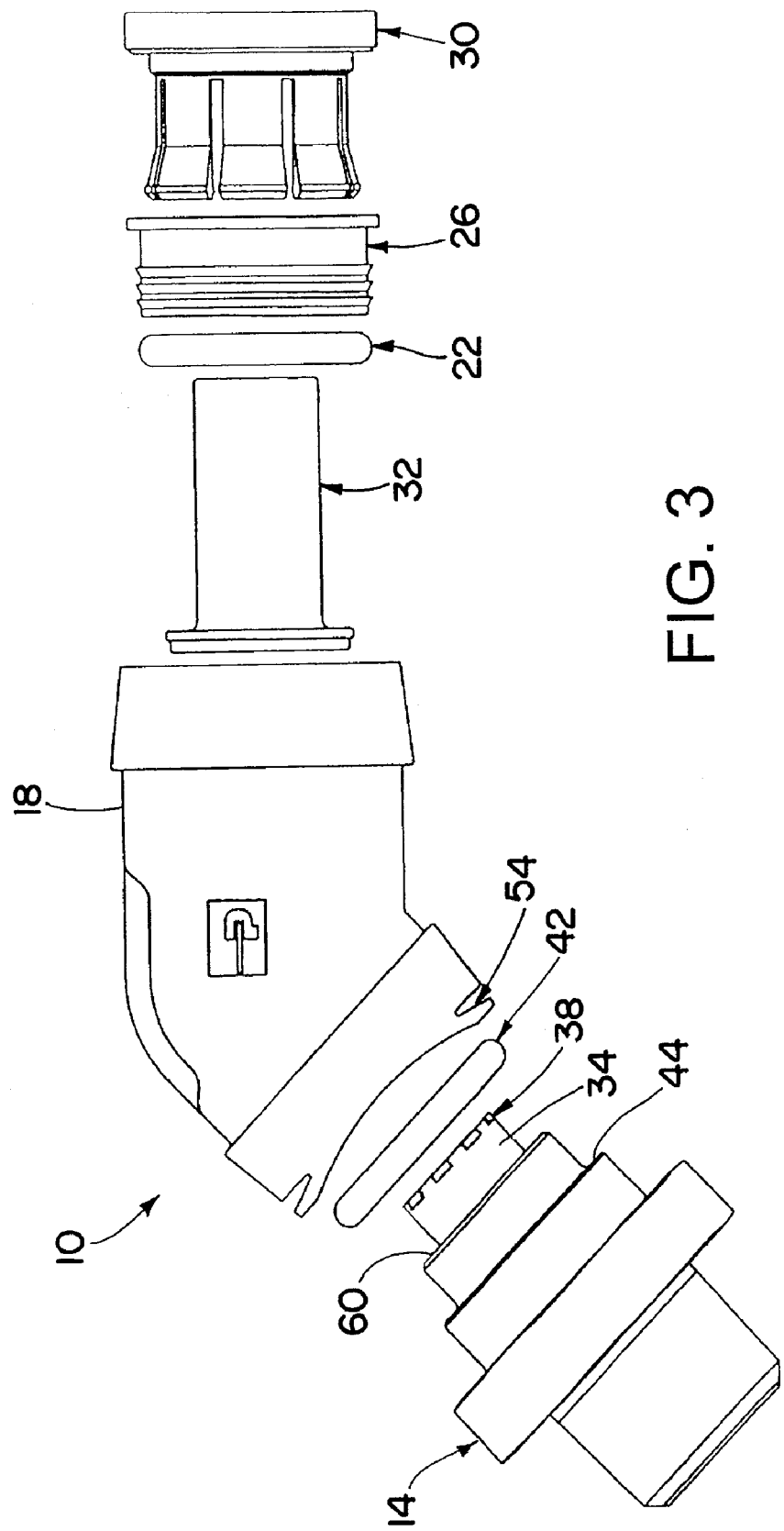
FIG. 3 is an exploded view of the coupling of FIG. 1.

With reference to FIG. 3, the coupling 10 includes a conventional push-to-connect assembly for securing a tube to the body 18. The push-to-connect assembly can include an O-ring 22, a brass sleeve 26, a brass push-to-connect collet 30, and a tube support 32. These components are generally typical of push-to-connect assemblies and operate in a conventional manner to enable connection of a tube to the body 18. It will be appreciated that the tube support 32 can be molded, made of stainless steel, brass, copper or any other suitable metal or material, and can be incorporated into the body 18, as desired.

It will be appreciated that the invention is not limited by the manner in which tubes, conduits, etc. are connected to the coupling, or the manner in which the coupling 10 is installed in a manifold block, for example. Any suitable manner of connecting the coupling to a one or more tubes, manifolds, etc. can be employed without departing from the scope of the invention.

Turning to the details of the invention, the stem 14 has a nipple portion 34 that is insertable into a nipple receiving portion of the body 18. The nipple portion 34 has at an end thereof a radially outwardly extending barb 38 for engaging a surface within the body 18 to prevent withdrawal of the stem 14 from the body 18 once inserted therein. A seal, such as O-ring 42, is provided for sealing the stem 14 to the body 18. Seal 42 is retained between a shoulder 44 of the stem 14 and a counterbore 46 in the body 18. It will be appreciated that sufficient clearance between the shoulder 44 and the bottom of counterbore 46 is provided to allow for further insertion of the stem 14 into the body 18 without overcompressing seal 42, as will be described in further detail below.

Figure 4:
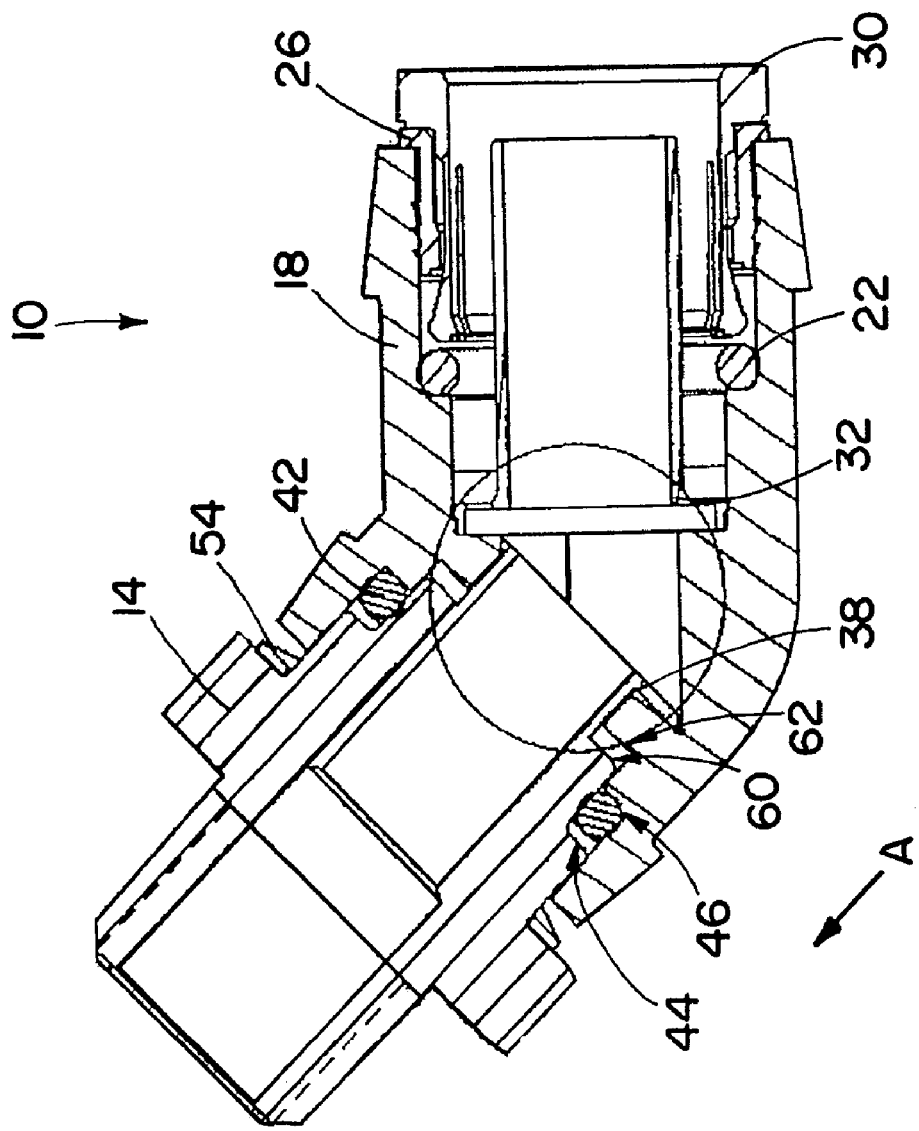
FIG. 4 is a cross-sectional view taken along the line 4-4 of the coupling of FIG. 2.
Figure 5:
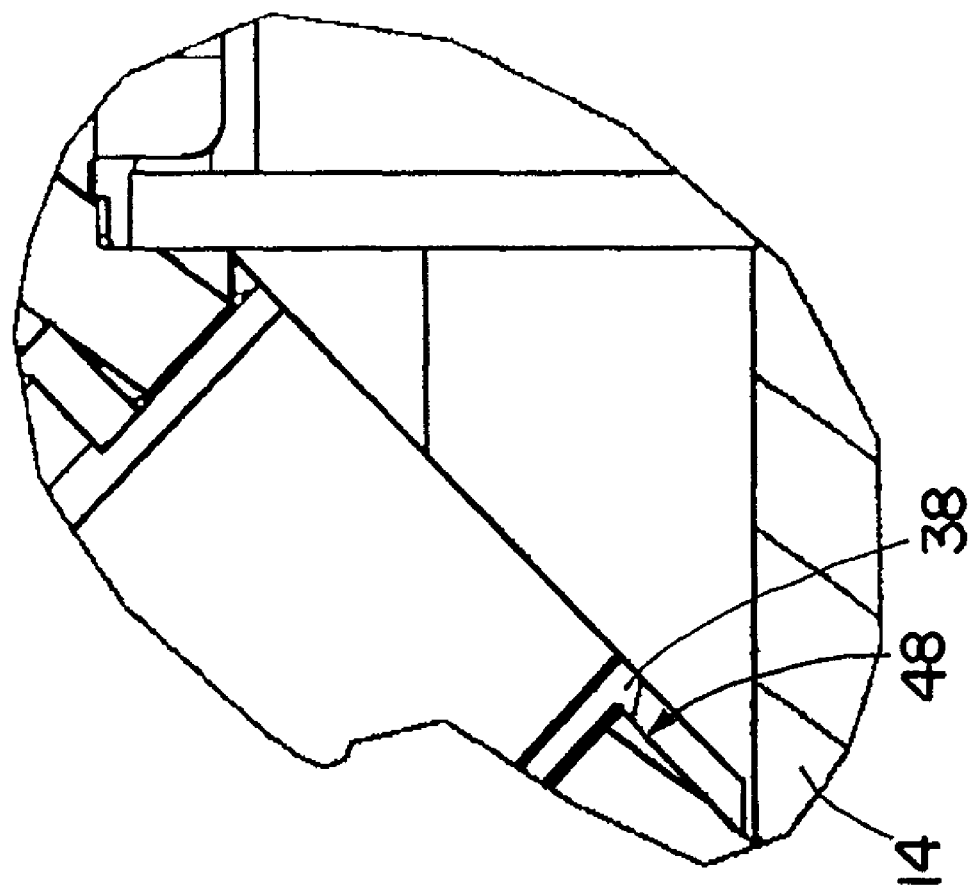
FIG. 5 is an enlarged portion of FIG. 4.

In FIG. 4, a cross-section of the assembled coupling 10 with the stem 14 in a locked position is illustrated. The nipple portion 34 of the stem 14 is received within the nipple receiving portion of the body 18 and, as best seen in FIG. 5, barb 38 is engaged with catch surface 48 thereby preventing withdrawal of the stem 14 from the body 18 while still allowing the stem 14 to be inserted further into the body 18.

Figure 6:
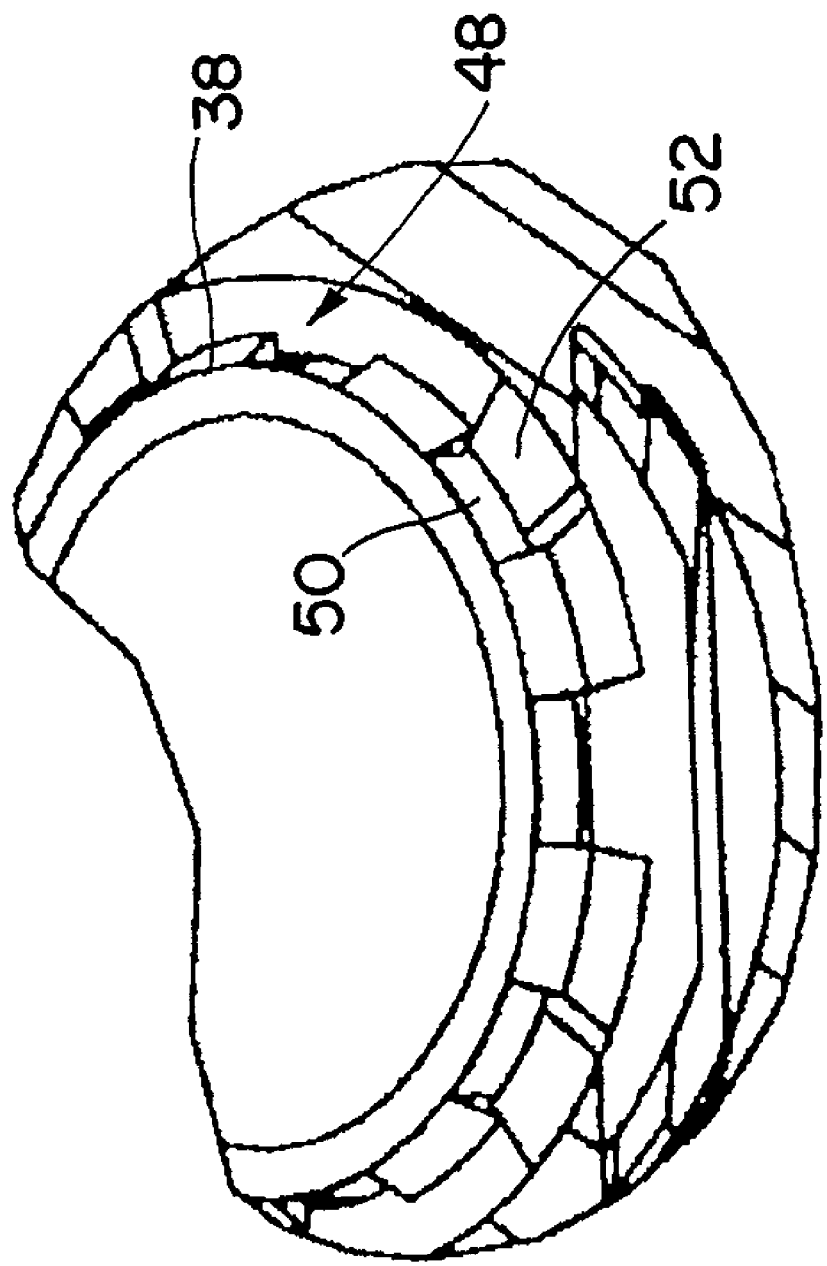
FIG. 6 is an enlarged perspective view of the rotational interlock of the coupling of FIGS. 1-5.

As illustrated in FIG. 6, the barb 38 has a plurality of gaps (e.g., slots) 50 therein that mate with corresponding projections 52 on the catch surface 48 when the stem 14 is in the locked position. The gaps 50 in the barb 38 and the projections 52 rotationally interlock to prevent rotation of the stem 14 with respect to the body 18. As will be appreciated, further insertion of the stem 14 into the body 18 axially displaces the gaps 50 in barb 38 from the protrusions 52 thereby allowing the stem 14 to be rotated independently of the body 18.

A spring 54 is provided to apply a separation force between the stem 14 and the body 18 when the coupling 10 is assembled and fluid pressure is not present in the coupling 10. When fluid pressure is present in the coupling 10, the pressure will augment the separation force. This separation force must be overcome for the user to further insert the stem 14 into the body 18 to the rotationally unlocked second position. The spring 54 can be a separate element, such as a spring washer, or can be formed as part of the body 18 or coupling 10, in general. In lieu of a spring, a removable clip could be provided to physically space the body 18 from the swivel stem 14 to maintain the coupling 10 in the locked position. Further, the O-ring 42 can be configured to provide a biasing force in a similar manner to that described below in connection with the coupling shown and described in FIGS. 20-28.

To operate the coupling 10, a user urges the stem 14 further into the body 14, typically by pressing down on the body 18, until a step 60 on the swivel stem 14 meets the bottom of a counterbore 62 inside the swivel the body 18. This ensures the necessary amount of travel of the stem 14 into the body 18 so the gaps 50 in the barb 38 clear the projections 52 on catch surface 48. While maintaining force on the stem 14 and/or body 18, the user can rotate the body 18 relative to the stem 14 to a desired position. The user then releases pressure on the stem 14 and/or body 18, and the spring 54 and/or pressure in the coupling 10 applies a separation force between the stem 14 and the body 18 thereby urging the stem 14 towards the first rotationally interlocked position. As the user turns the body 18, gaps 50 in the barb 38 rotationally interlock with the projections 52 on the catch surface 48 inside the body 18. The separation force applied by the spring 54 and/or pressure in the coupling 10 causes the bottom of the barb 38 to rest on the area catch surface 48 between adjacent projections 52.

When the stem 14 is pushed further into the body 18, the seal between the O-ring 42, the body 18 and the stem 14 is maintained by providing sufficient clearance between the shoulder 46 on the stem 14 and the bottom of counterbore 50 on the body 18. Thus, the coupling 10 can be rotationally adjusted after assembly without breaking coupling seal.

Figure 7:
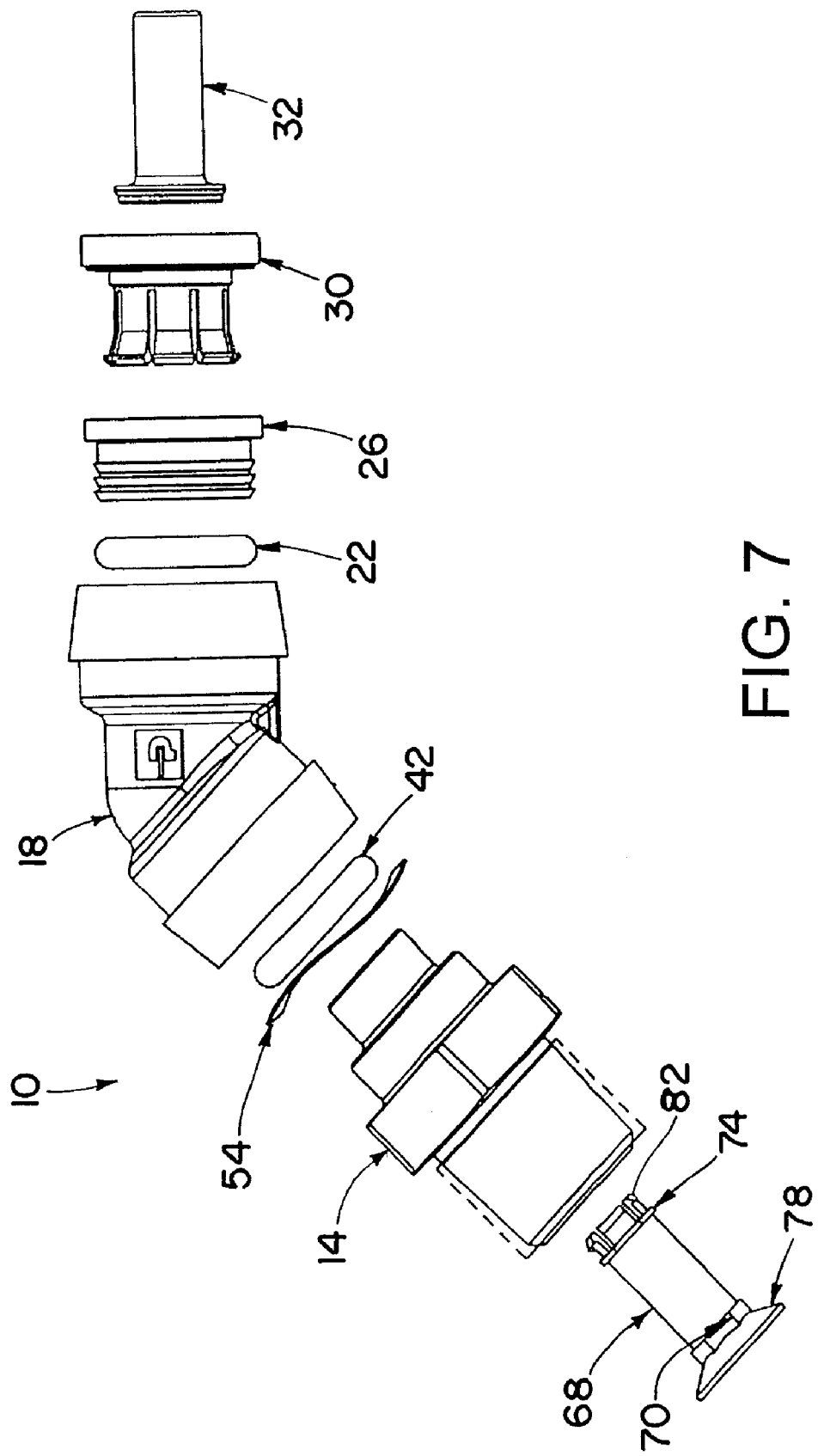
FIG. 7 is an exploded view of another exemplary coupling in accordance with the invention.
Figure 8:
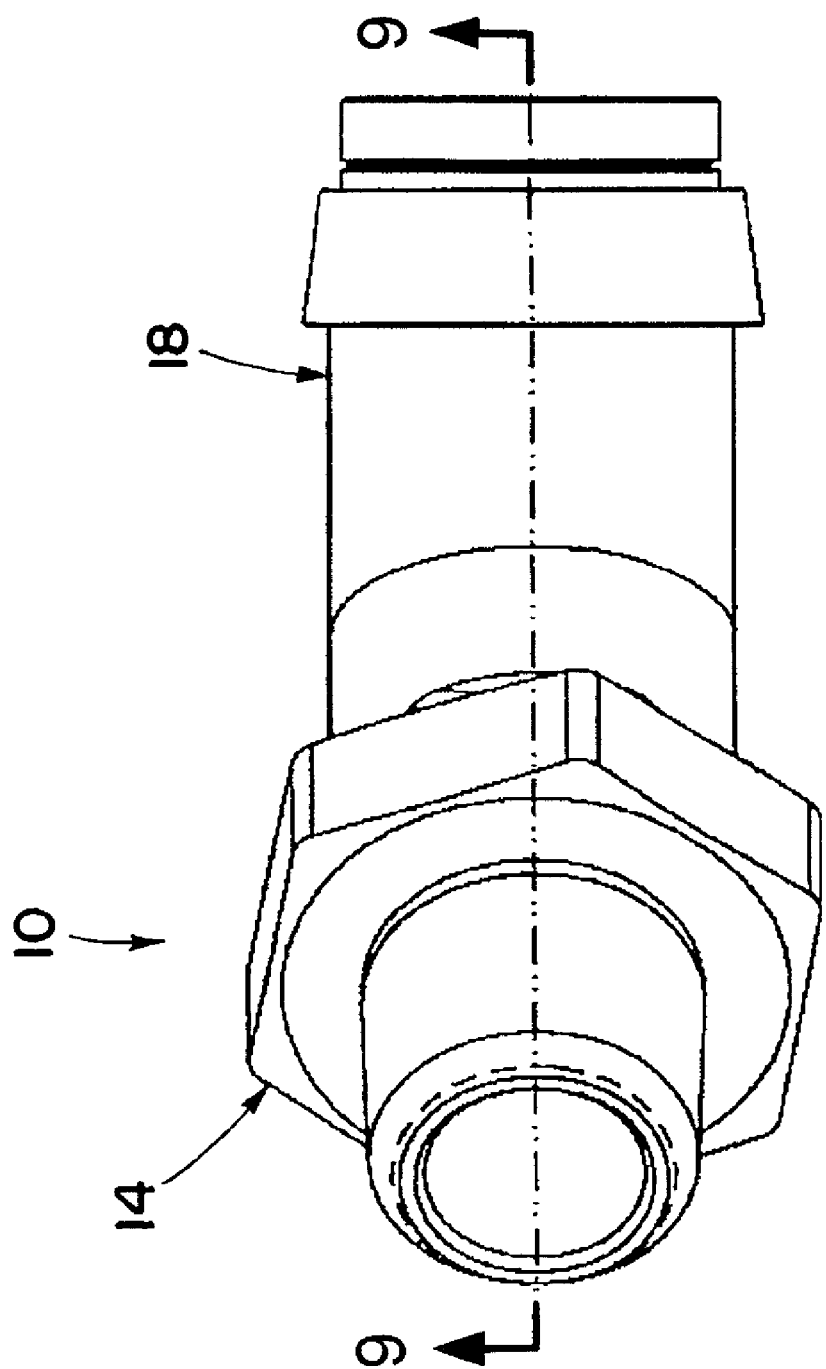
FIG. 8 is a perspective side view of the coupling of FIG. 7.
Figure 9:
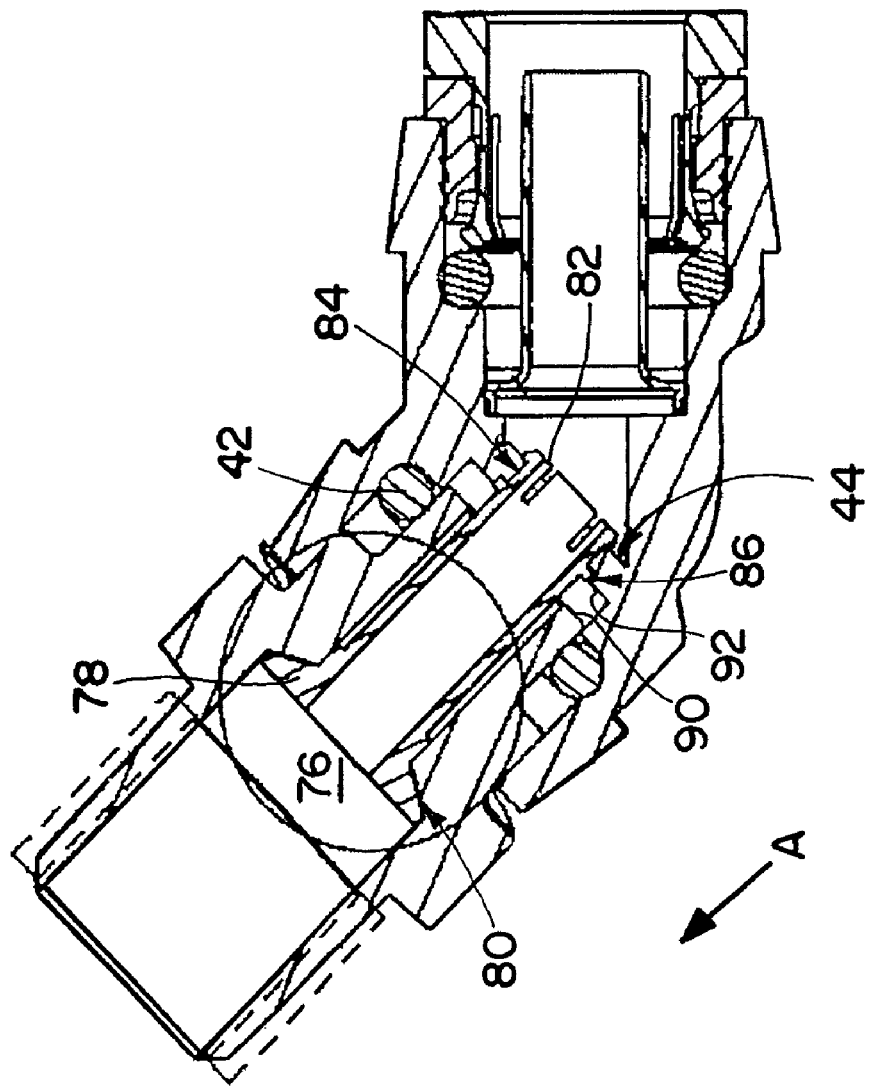
FIG. 9 is a cross-sectional view taken along the line 9-9 of the coupling of FIG. 8.

Turning now to FIGS. 7-12, and initially to FIG. 7, another exemplary coupling 10 in accordance with the invention is illustrated. The coupling 10 is similar in many respects to the previously described coupling, with the exception that an additional part is utilized for the retention and locking features. The additional part, swivel lock 68, is fixed axially and rotationally with respect to the body 18. The swivel lock has key 70 at its base for interlocking with a corresponding surface of the swivel stem 14 when in the locked position. Movement of the stem 14 further into the body 18 axially shifts the corresponding surface of the swivel stem 14 to allow relative rotation of the swivel stem 14 with respect to the body 18.

Figure 10:
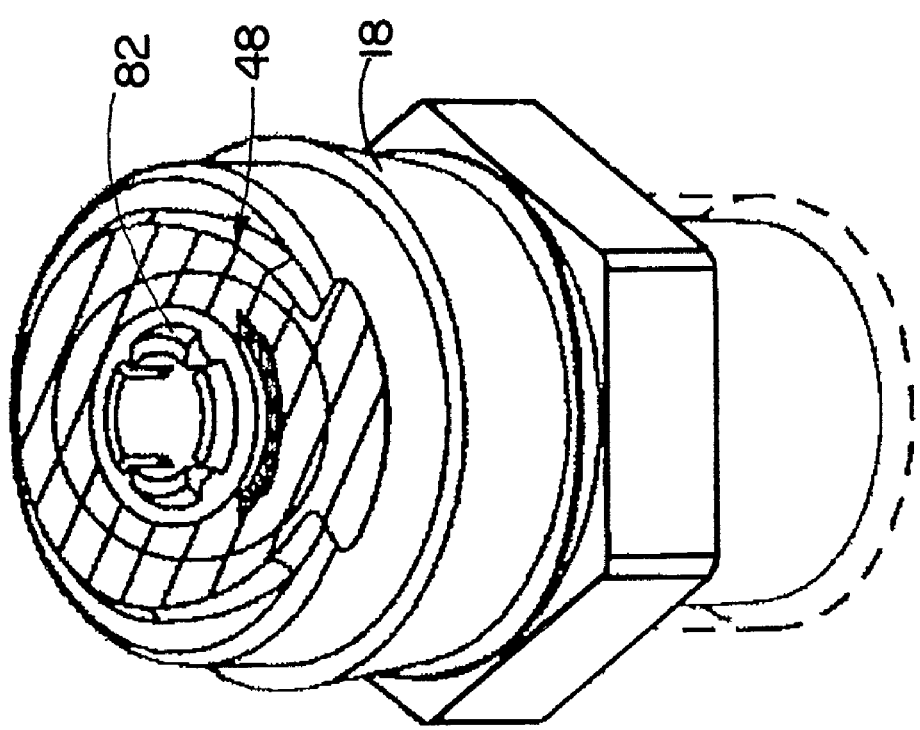
FIG. 10 is a partial cross-sectional view of the coupling of FIGS. 7-9.
Figure 11:
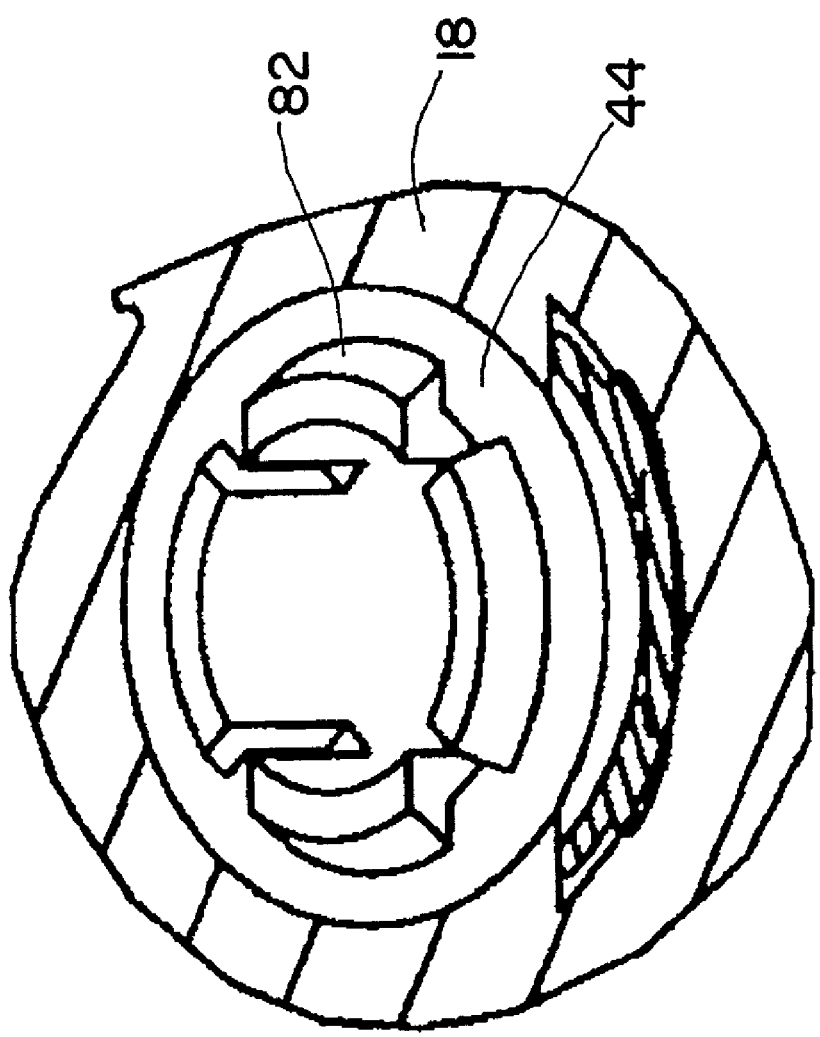
FIG. 11 is an enlarged partial cross-sectional view of the coupling of FIGS. 7-9.
Figure 12:
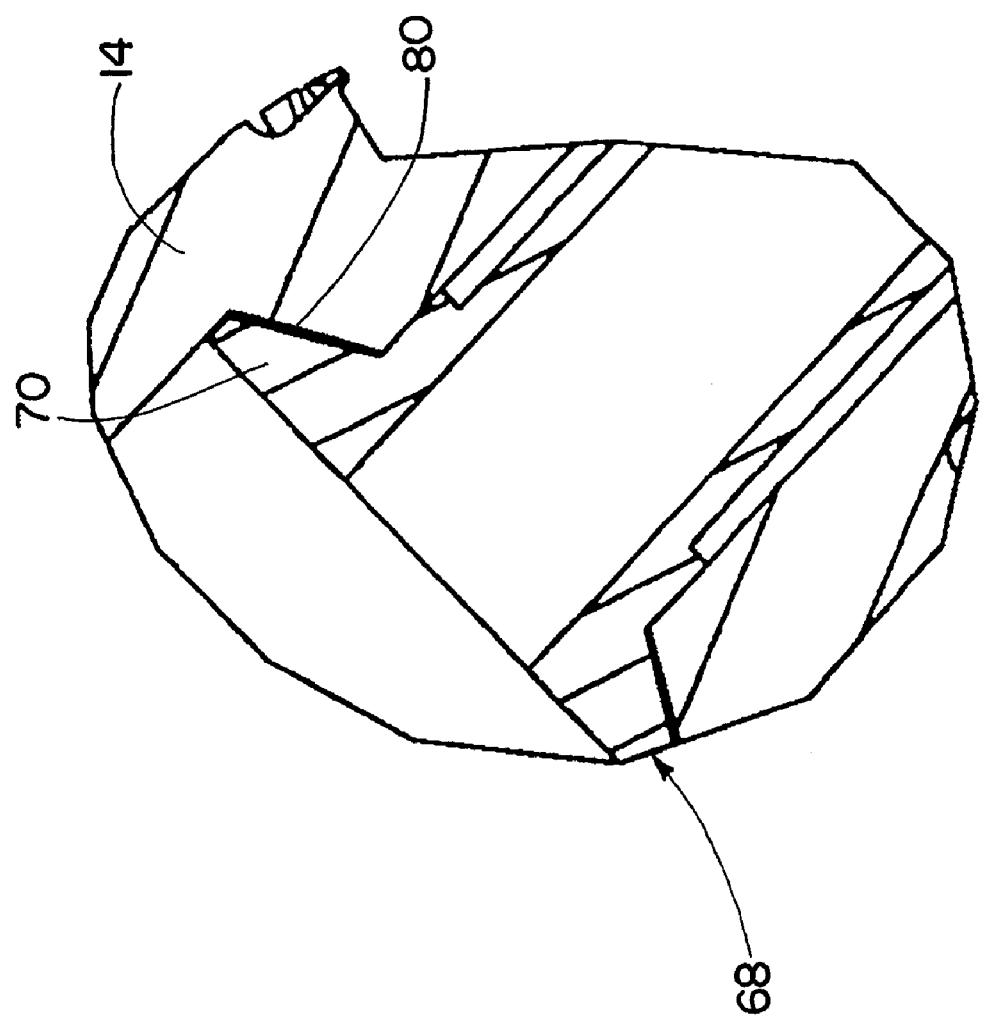
FIG. 12 is an enlarged portion of FIG. 9.
Figure 13:
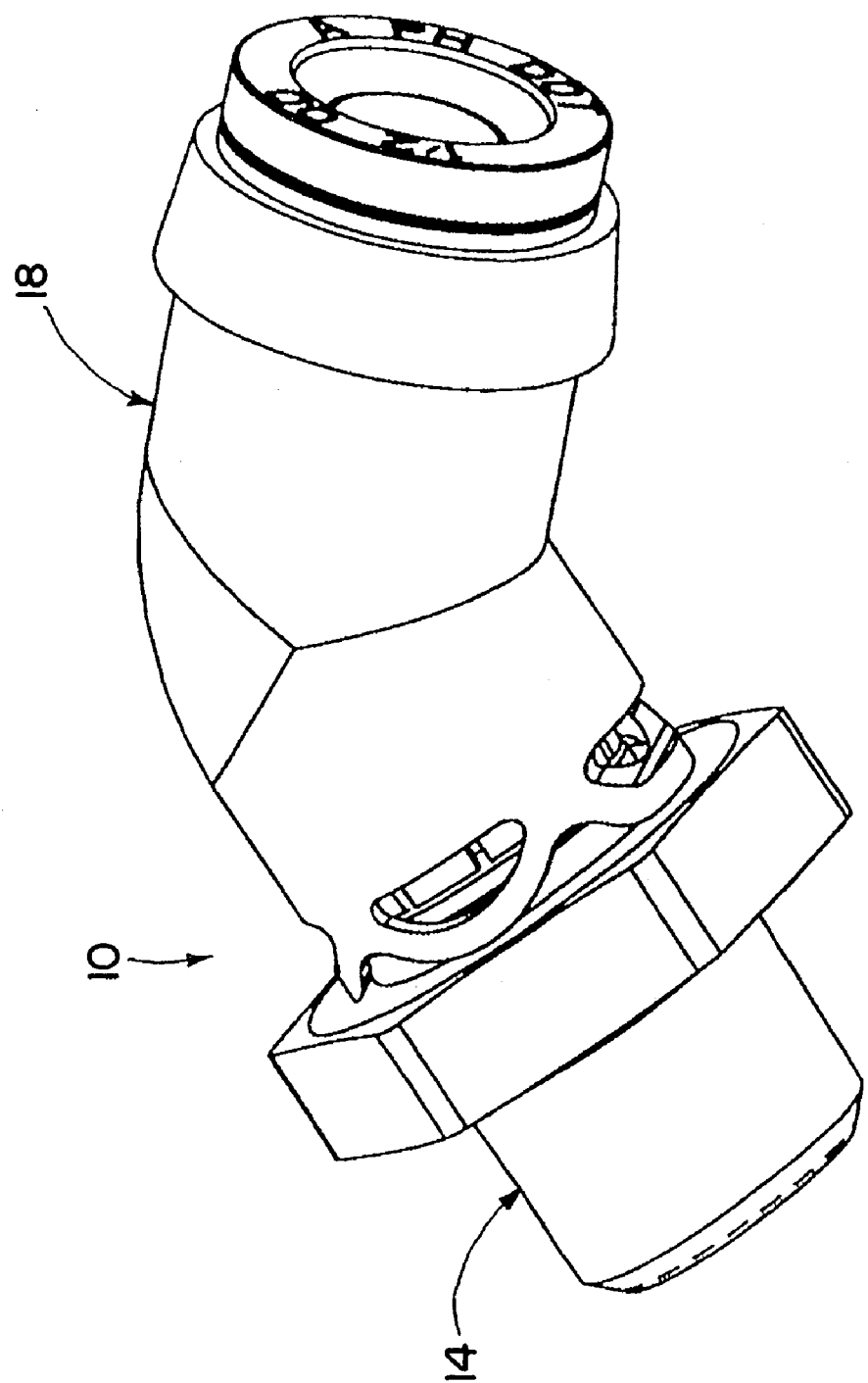
FIG. 13 is a perspective view of another exemplary coupling in accordance with the invention.

To assemble the coupling 10, the swivel lock 68 is pushed through passageway 76 of the stem 14 until flange 78 on the swivel lock 68 contacts a shoulder 80 on the inside of the swivel stem 14. Clips 82 on the tip of the swivel lock 68 allow it to be pushed through the passageway 76 by collapsing inward. An o-ring 42 and disc spring 54 are placed over the swivel stem 14, and this subassembly is inserted into the body 18 until the clips 82 pass through a hole 84 on the inside of the body 18, as best shown in FIGS. 10 and 11. Once through the hole, the clips 82 spring radially outwardly and rest on a catch surface 48, thereby preventing withdrawal of the swivel lock 68 from the body 18. The swivel lock 68 is prevented from going further into the body 18 by key 74 which rests in corresponding counterbore 86. Key 74 also fixes swivel lock 68 against rotation with respect to the body 18. Thus, once installed, swivel lock 68 is fixed both axially and rotationally with respect to the body 18. Meanwhile, swivel stem 14 and body 18 can move axially together, as will now be described.

The coupling 10 is operated in a manner similar to that of the previously described coupling. Thus, a user applies force to the body 18 that causes shoulder 90 on the swivel stem 14 to contact counterbore 92 inside the body 18. Because the swivel lock 68 is axially fixed with respect to the body 18, as the swivel stem 14 is moved further into the body 18, the key 78 is shifted axially from the corresponding surface of the swivel stem 14 to a disengaged position thereby allowing the swivel stem 14 to rotate with respect to the body 18. The user then returns the coupling 10 to the rotationally interlocked position in the same manner as described previously.

Turning now to FIGS. 13-19, another exemplary coupling 10 in accordance with the invention is indicated generally by reference numeral 10. The coupling 10 is generally similar in many respects to the previous couplings described above, with the exception of the anti-rotation feature, which will now be described.

Figure 14:
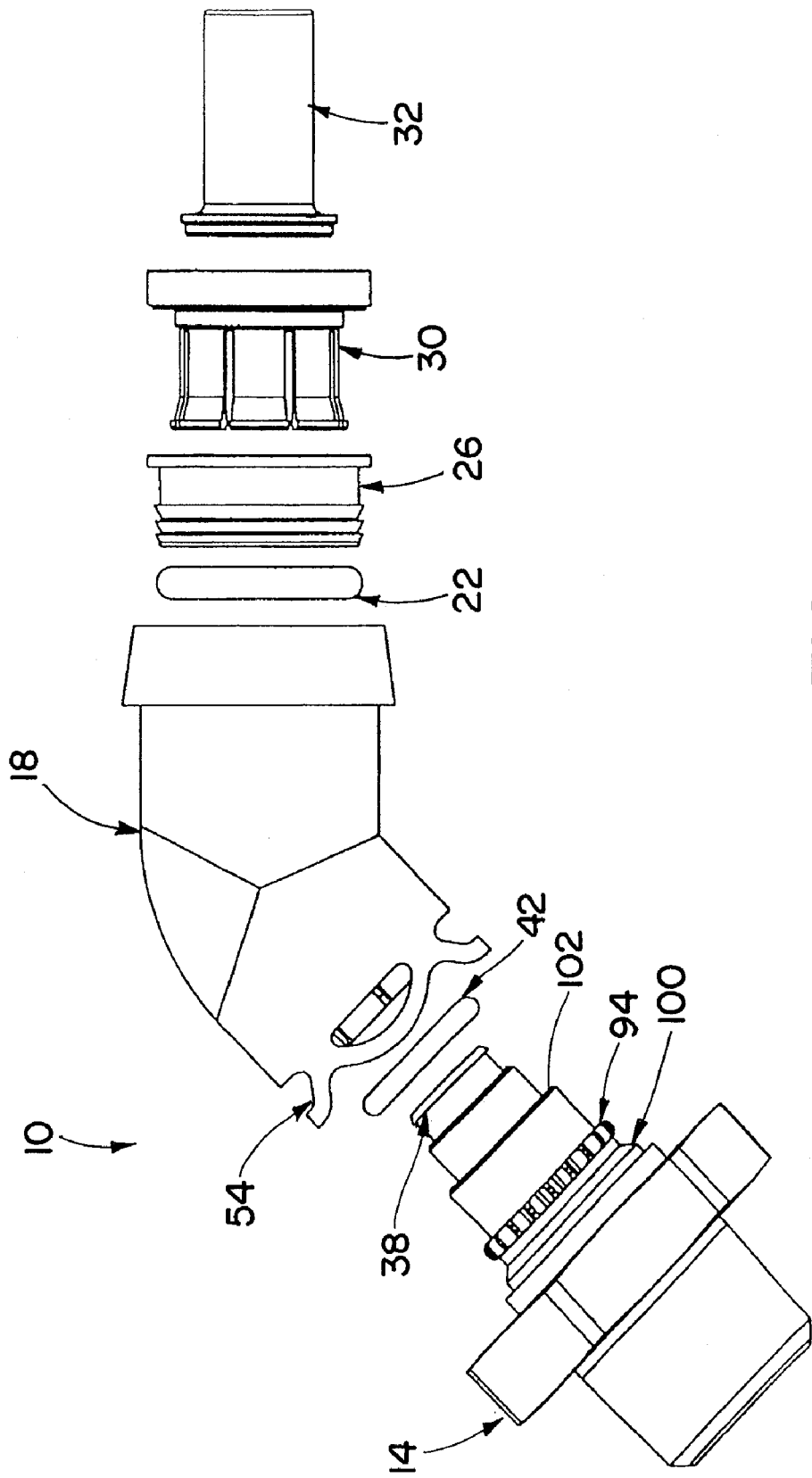
FIG. 14 is an exploded view of the coupling of FIG. 13.
Figure 15:
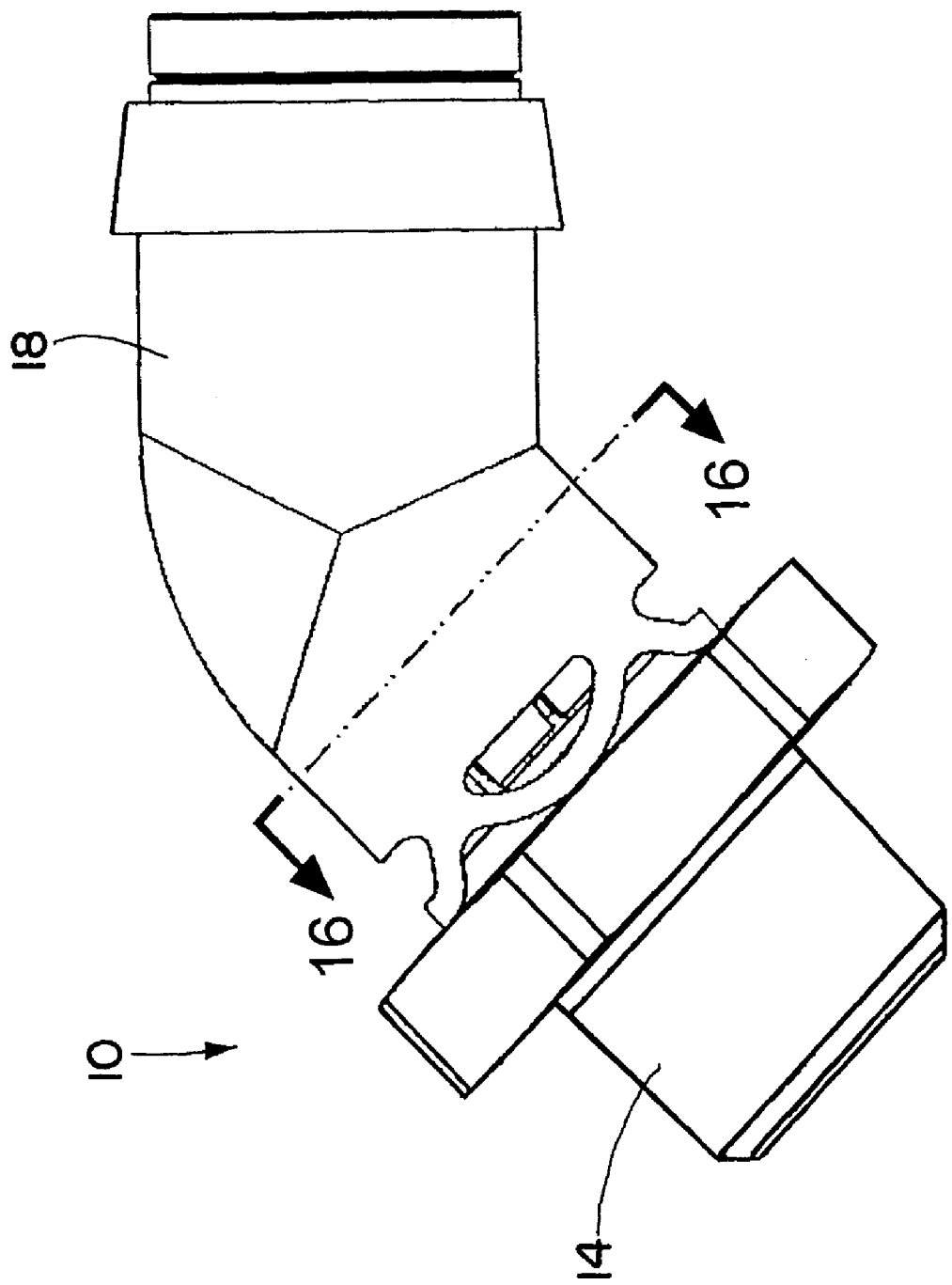
FIG. 15 is another perspective view of the coupling of FIG. 13.
Figure 16:
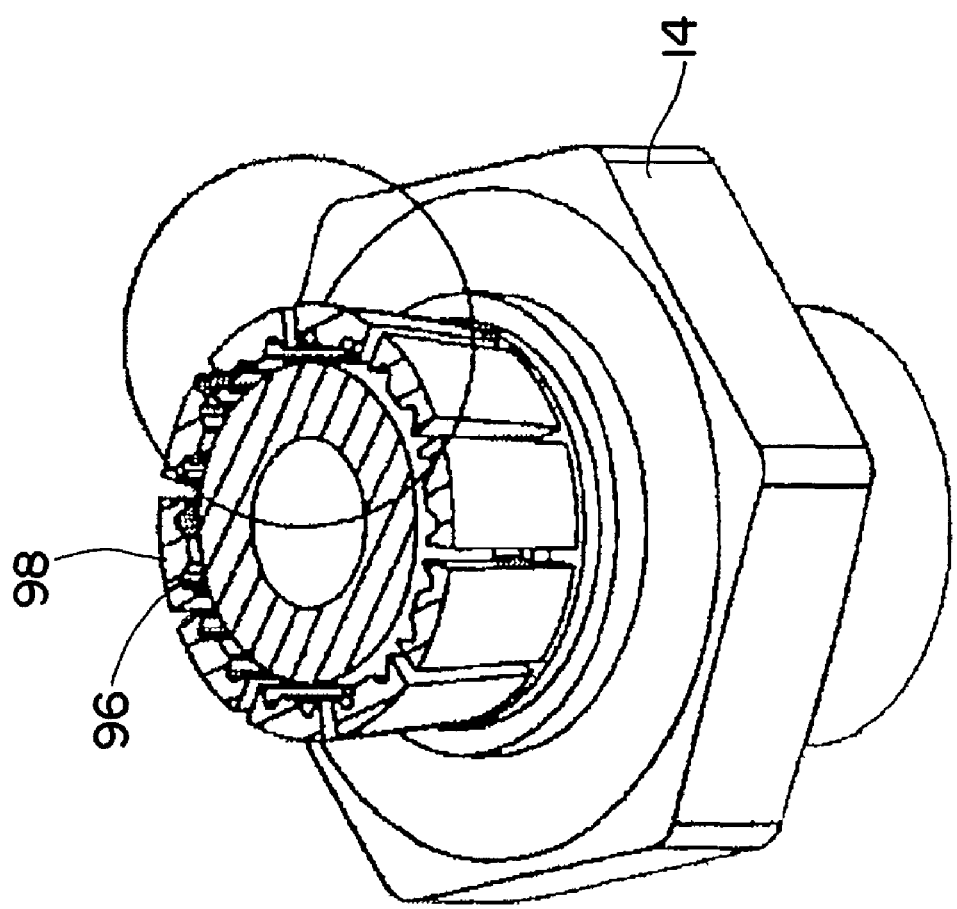
FIG. 16 is a partial cross-sectional view taken along the line 16-16 of FIG. 15.
Figure 17:
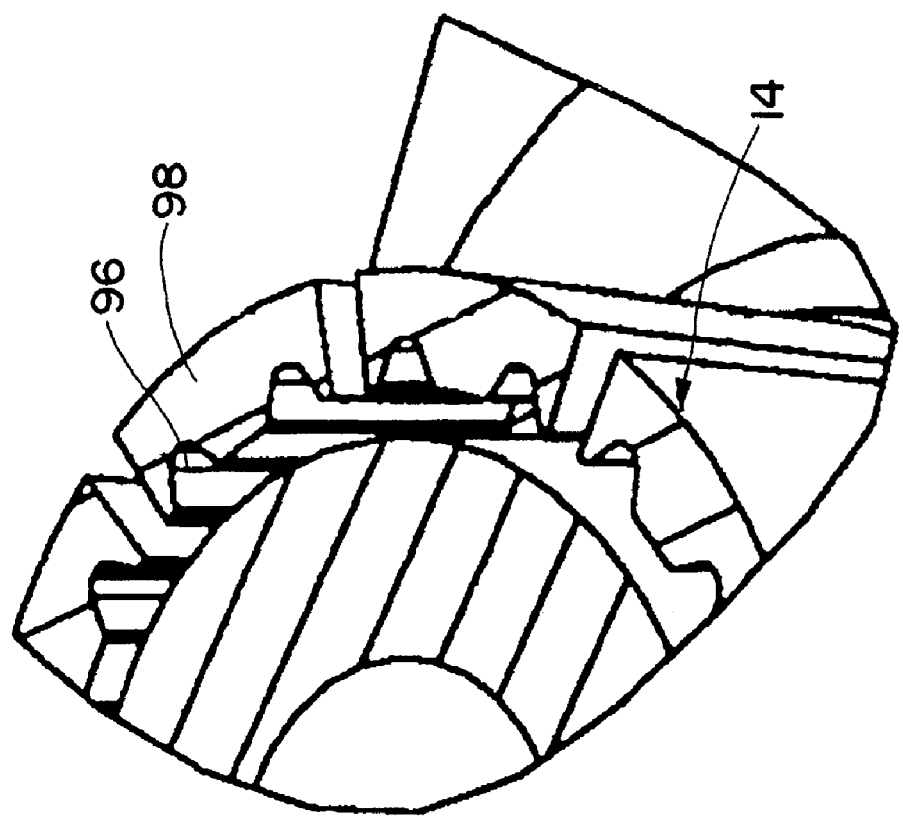
FIG. 17 is an enlarged portion of FIG. 16.
Figure 18:
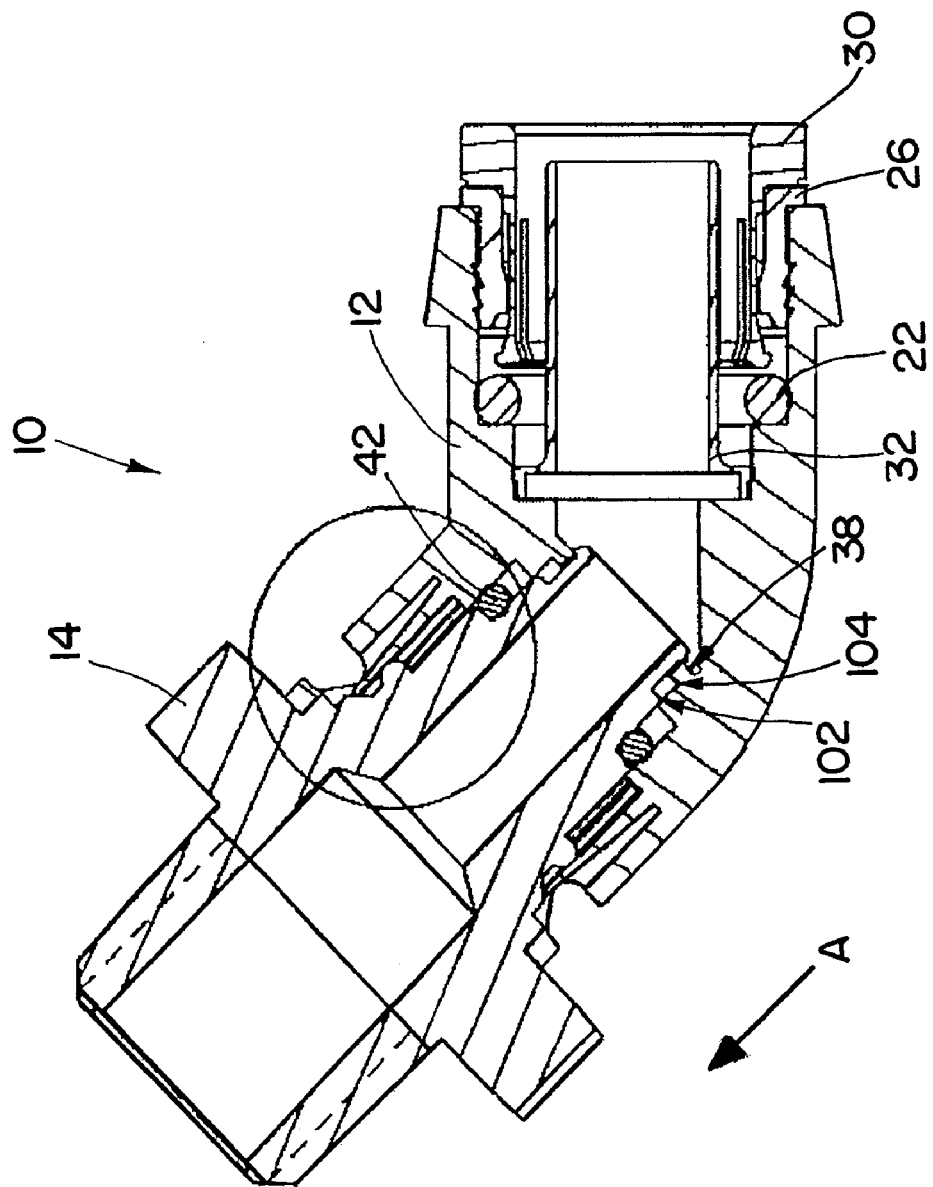
FIG. 18 is a cross-sectional view taken along the length of the coupling of FIG. 13.
Figure 19:
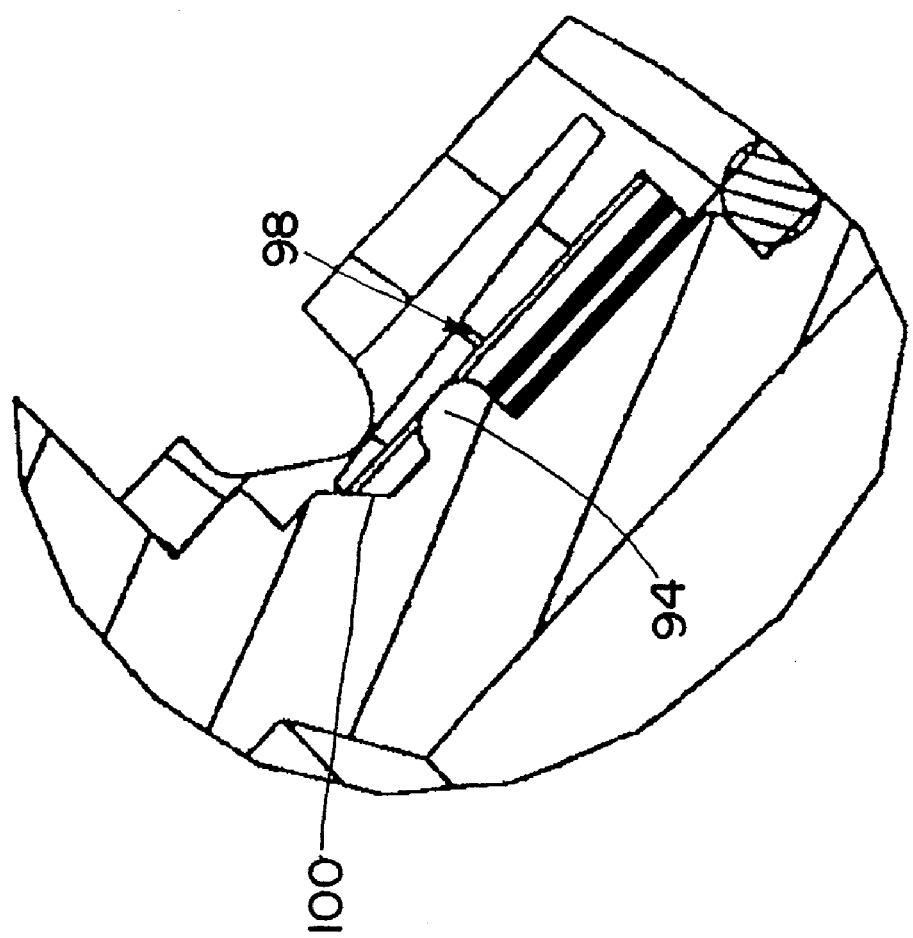
FIG. 19 is an enlarged portion of FIG. 18.

With reference to FIG. 14, a barb 38 at the tip of the swivel stem 14 retains the swivel stem 14 in the body 18 when pressed into the body 18 and resting against catch surface 44, similar to the coupling shown and described in FIGS. 1-6. Teeth-like projections 94 on an outer surface of the swivel stem 14 interlock with corresponding grooves 96 in flexible protrusions 98 on the inside of the body 18 (see FIG. 16). These cantilevered protrusions 98 extend axially and spaced apart from the body 18, and are separated from the teeth-like projections 96 when force is applied to the body 18 to cause the protrusions 98 to contact an angled surface 100 of the stem 14. When step 102 on the stem 14 contacts the shoulder 104 on the inside of the body 18, the teeth-like projections 94 are able to clear the now radially-outwardly deflected protrusions 98 allowing the body 18 to be rotated with respect to the stem 14. As with the other couplings described above, the user removes the force to the body 18 and/or stem 14 and rotates the body 18 and/or stem 14 into the next discrete position whereat the coupling returns to the locked position. As in the other couplings, a spring can be provided to urge the stem 14 axially towards the rotationally interlocked position.

Turning now to FIGS. 20-29, yet another coupling in accordance with the invention is indicated generally by reference numeral 10. This coupling 10 includes a swivel stem 14, a body 18, a sleeve 110 for securing the swivel stem 14 to the body 18, and a pair of O-rings 112 for sealing the swivel stem 14 to the body 18.

To assemble the coupling 10, the swivel stem 14 is pressed through the sleeve 110. The O-rings 112 are then assembled onto a nipple portion of the swivel stem 14, and then this sub-assembly is pressed into the body 18. Slots 120 on the sleeve 110 (FIGS. 24-26) fit into corresponding keys 122 (FIGS. 27-28) in the body 18 for rotationally fixing the sleeve 110 and body 18 together.

Figure 20:
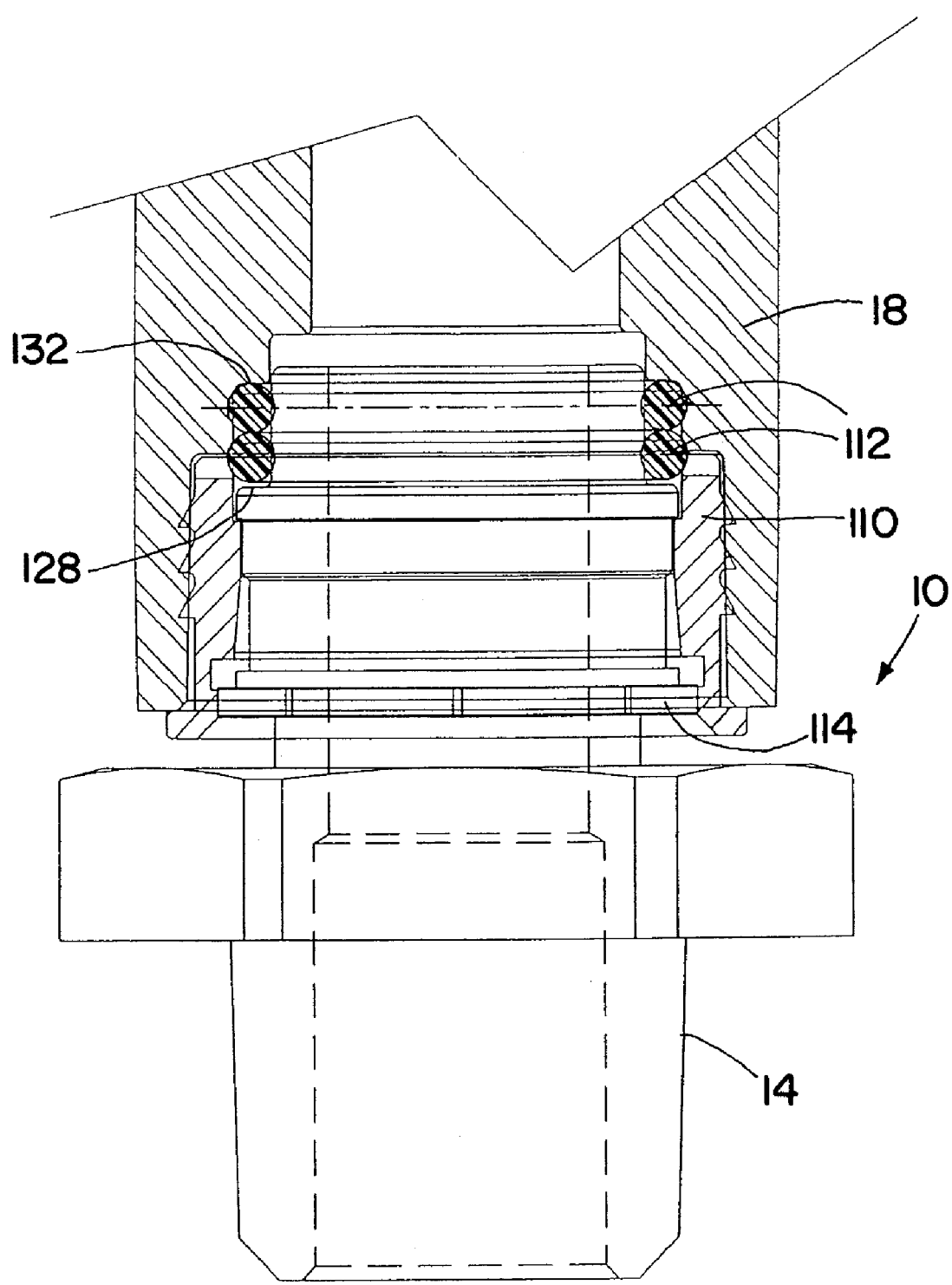
FIG. 20 is a cross-sectional view of another exemplary coupling in a rotationally locked position in accordance with the invention.
Figure 21:
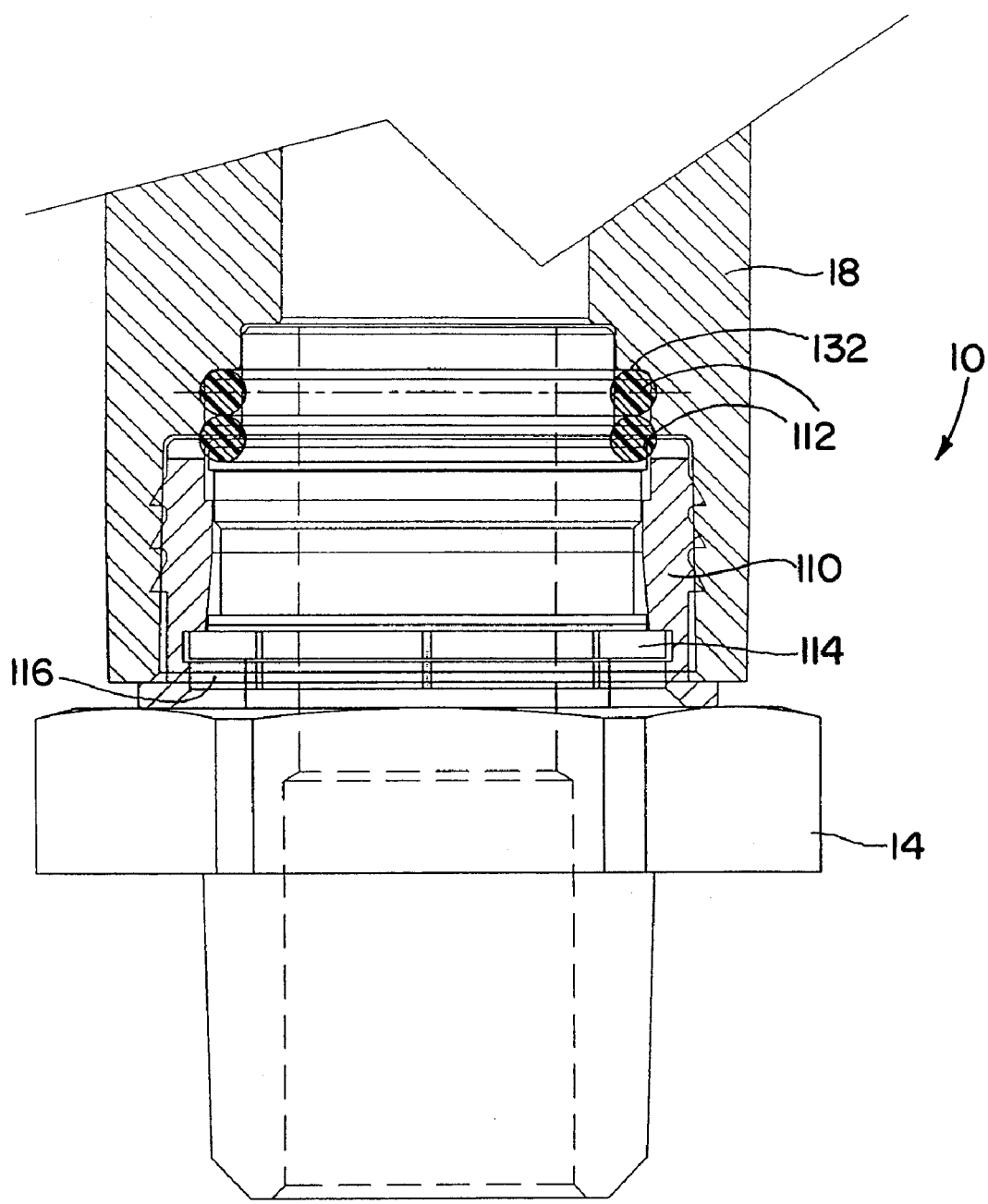
FIG. 21 is a cross-sectional view of the coupling of FIG. 20 is a rotationally unlocked position.
Figure 23:
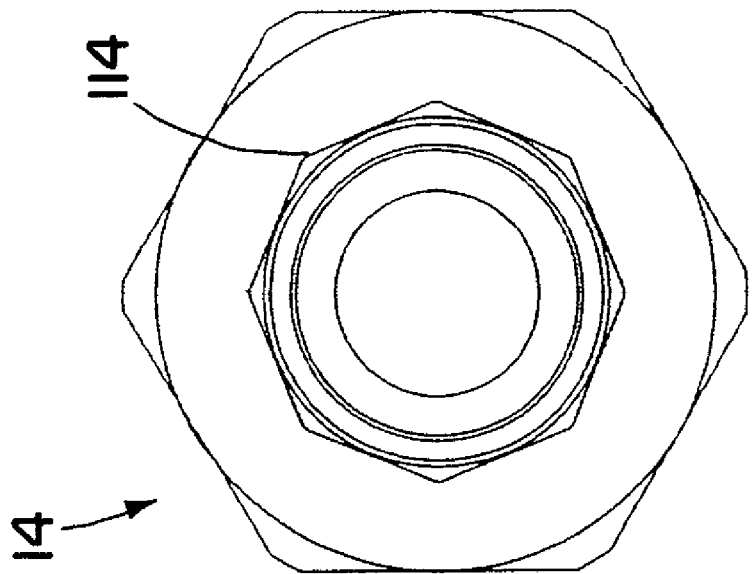
FIG. 23 is an end view of the swivel stem of FIG. 22.
Figure 22:
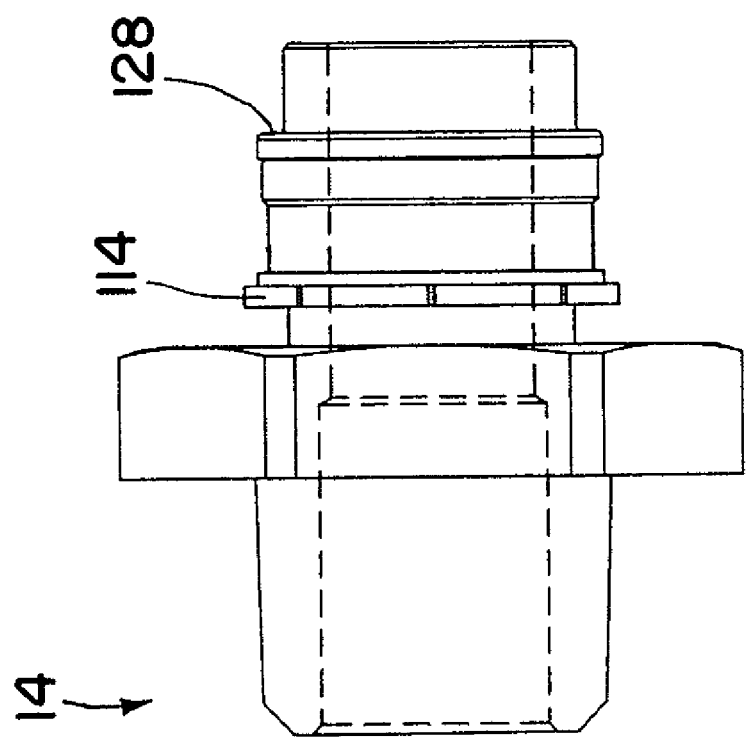
FIG. 22 is a side view of a swivel stem of the coupling of FIGS. 20 and 21.
Figure 26:
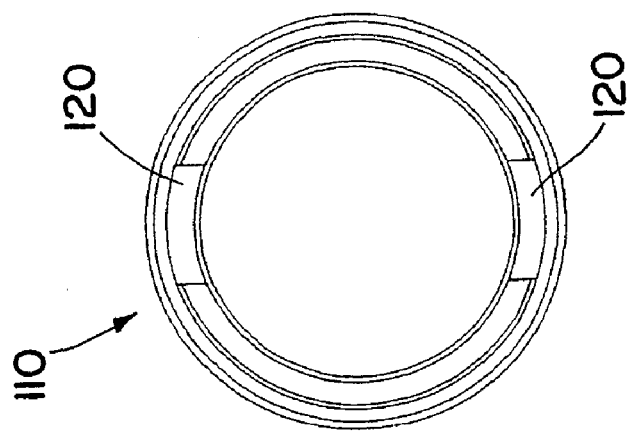
FIG. 26 is another end view of the sleeve of the coupling of FIGS. 20 and 21.
Figure 25:
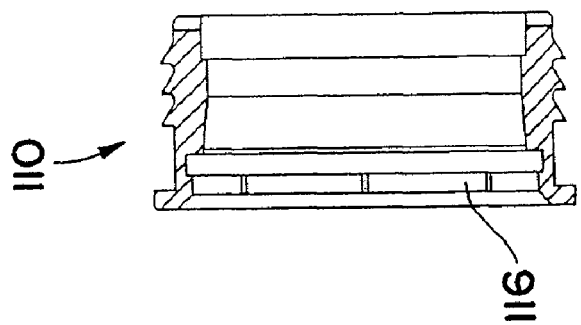
FIG. 25 is a cross-sectional view of the sleeve of FIG. 24.
Figure 24:
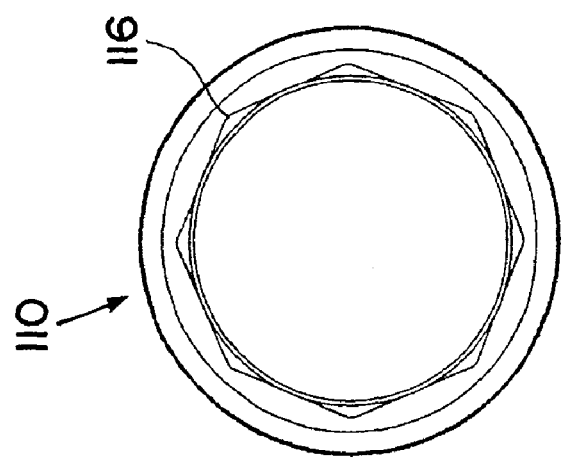
FIG. 24 is an end view of a sleeve of the coupling of FIGS. 20 and 21.
Figure 28:
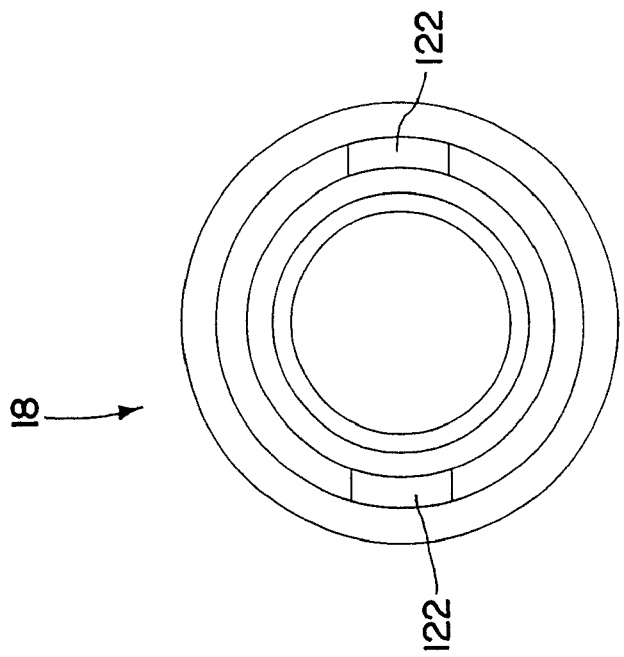
FIG. 28 is an end view of the body of FIG. 27.
Figure 27:
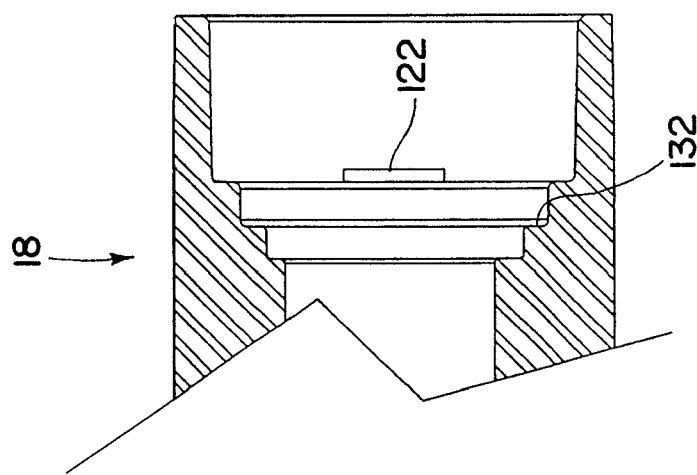
FIG. 27 is a cross-sectional view of a body of the coupling of FIGS. 20 and 21.

As shown in FIGS. 22 and 23, the swivel stem 14 has a keyed surface 114 for rotationally interlocking with a corresponding surface 116 of the sleeve 110 (see FIGS. 24 and 25) when the coupling 10 is in a locked position, such as in FIG. 20. In the illustrated embodiment, the keyed surface 114 is octagonal and, accordingly, the coupling can be rotationally positioned in eight different orientations. As will be appreciated, a greater or lesser number of sides of the keyed surface can be provided to achieve different number of discrete rotational positions. When the coupling 10 is in the unlocked position, shown in FIG. 21, the keyed surface 114 is axially displaced from the corresponding surface 116 of the sleeve 110 thereby allowing rotational adjustment of the coupling 10.

As will now be appreciated, in the position shown in FIG. 20, the coupling 10 is rotationally locked. As with the previously described couplings, a user can apply pressure to the coupling to further insert the swivel stem 14 into the body 18 in order to move the coupling to the unlocked position whereat the body 18 can be rotated relative to the stem 14. Once rotational adjustment is complete, the user can remove the pressure and return the coupling 10 to the rotationally locked position of FIG. 20.

The two O-rings 112 act to both seal the swivel stem 14 to the body 18 and to provide an axial spring force to bias the swivel stem 14 outward from the sleeve 110 and/or body 18. As is evident in FIG. 20, the O-rings 112 are retained axially between a shoulder 128 on the swivel stem 14 and a counterbore 132 in the body 18. The O-rings 112 are sized to generally occupy the axial extent of the gap between shoulder 128 and counterbore 132. This results in a bias being applied to the stem 14 an/or body 18 that tends to urge the two components apart to the position of FIG. 20. This bias generally keeps the octagonal key surface 114 on the swivel stem 14 disposed within the corresponding surface 116 of the sleeve 110 thereby preventing the swivel stem 14 from rotating relative to the sleeve 110 and body 18.

The O-rings 112 in FIG. 21 are schematically illustrated, and it will be appreciated that in the unlocked position, the O-rings 112 will generally be compressed and/or deformed as shoulder 128 is forced towards counterbore 132 and the axial extent of the gap therebetween is decreased. Thus, the biasing force applied to the stem 14 and/or body 18 by the O-rings 112 will typically be greater when the coupling 10 is in the unlocked position of FIG. 21 and the O-rings 112 are compressed. Therefore, upon release of the pressure on the coupling 10 by the user, the coupling will tend to return to the locked position of FIG. 20.

It will be appreciated that in the forgoing description, movement of the swivel stem 14 and the body 18 may be described in relative terms. Thus, in some applications the swivel stem 14 may be stationary while the body 18 is moved, and in other applications the body may be stationary while the swivel stem is moved. Accordingly, it should be apparent that the foregoing description is not limited to movement of one or the other of that parts of the couplings, and that in some cases both coupling may be moved relative to each other and to another fixed point.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A coupling comprising:
   a female part; and
   a male part telescopically insertable into the female part to enable fluid communication between respective passages in the male and female parts;
   wherein the male and female parts have rotationally interfering members for rotationally interlocking the parts together; and
   wherein the male part is insertable into the female part to a first position whereat the male and female parts are fixed against rotation relative to each other, and further insertable into the female part to a second position whereat the male and female parts can be rotated relative to each other.

2. A coupling as set forth in claim 1, wherein the rotationally interfering members rotationally interlock the male and female parts together in the first position, and wherein when the male part is inserted further into the female part to the second position, the rotationally interfering members are axially spaced apart thereby allowing rotation of the male part with respect to the female part.

3. A coupling as set forth in claim 1, further comprising a biasing member for biasing the male part towards the first position.

4. A coupling as set forth in claim 3, wherein the biasing member is a spring element formed integrally with at least one of the male part or female part.

5. A coupling as set forth in claim 1, further comprising a seal for sealing the male part to the female part.

6. A coupling as set forth in claim 5, wherein the seal is captured between a shoulder on the male part and a counterbore in the female part.

7. A coupling as set forth in claim 6, wherein the seal is a resilient sealing element configured to bias the male part towards the first position.

8. A coupling as set forth in claim 1, wherein further insertion of the male part into the female part beyond the second position is limited by interference between a radially extending shoulder on the nipple portion of the male part and a counterbore in the female part.

9. A coupling as set forth in claim 1, wherein the male part includes a nipple portion that is telescopically insertable into a socket of the female part, the nipple portion having a radially extending barb for engaging a surface of the female part to restrict withdrawal of the male part from the female part when in the first position while still allowing further insertion of the male part into the female part.

10. A coupling as set forth in claim 1, wherein the male part has radially extending teeth on an outer surface thereof for engaging with and the female part has a plurality of cantilevered axially extending projections configured to engage the teeth on the male part when the male part is in the first position thereby rotationally interlocking the male part and female part.

11. A coupling as set forth in claim 10, wherein the male part further comprises an angled surface spaced axially from the teeth for urging the projections radially outwardly when the male part is further inserted into the female part to the second position to thereby disengage the projections from the teeth to allow rotation of the male part with respect to the female part.

12. A coupling as set forth in claim 1, wherein the first position is a latched position precluding the male part from being withdrawn from the female part.

13. A coupling as set forth in claim 1, wherein the female part includes a socket that opens to an axial end of the female part, and wherein the rotationally interfering members of the female part are located within the socket.

14. A coupling comprising:
a female part; and
a male part telescopically insertable into the female part to enable fluid communication between respective passages in the male and female parts;
wherein the male part is insertable into the female part to a first position whereat the male and female parts are fixed against rotation relative to each other, and further insertable into the female part to a second position whereat the male and female parts can be rotated relative to each other; and
wherein the female part includes a socket that opens to an axial end of the female part, the socket having a nipple receiving portion and a catch portion at a location axially inwardly of the nipple receiving portion, wherein the male part includes a nipple portion that is telescopically insertable into the socket, the nipple portion having a radially extending barb for engaging a surface of the catch portion to restrict withdrawal of the male part from the female part when in the first position while still allowing further insertion of the male part into the female part.

15. A coupling as set forth in claim 14, wherein mating surfaces of the catch portion and the barb have interlocking protrusions and recesses that restrict rotation of the male part relative to the female part when the male part is in the first position, and wherein when the male part is inserted further into the socket to the second position, the interlocking protrusions on the mating surfaces of the catch portion and the barb are axially spaced apart thereby allowing rotation of the male part with respect to the female part.

16. A coupling comprising:
a female part; and
a male part telescopically insertable into the female part to enable fluid communication between respective passages in the male and female parts;
wherein the male part is insertable into the female part to a first position whereat the male and female parts are fixed against rotation relative to each other, and further insertable into the female part to a second position whereat the male and female parts can be rotated relative to each other; and a swivel lock member for axially and rotationally interlocking the male part to the female part, the swivel lock member having tubular portion having a barb on a first end thereof for engaging a catch surface of the female part to prevent withdrawal of the swivel lock member from the female part, and a radially outwardly extending shoulder at a second end of the tubular portion, an outer circumferential surface of the shoulder having a non-circular cross-section for engaging a correspondingly shaped inner circumferential surface of a counterbore of the male part for rotationally and axially fixing the male part to the swivel lock member when the male part is in the first position, wherein the swivel lock member is rotationally and axially interlocked with the female part, and wherein when the male part is further inserted into the female part, the counterbore of the male part is axially spaced apart from the shoulder of the swivel lock thereby allowing rotation of the male part with respect to the female part.

* * * * *